(No Model.)

J. H. SCRIBNER.
SPECTACLE FRAME SOLDERING CLAMP.

No. 324,276. Patented Aug. 11, 1885.

Witnesses:
Edmund V. Burke
John H. Scott

Inventor
James H. Scribner

UNITED STATES PATENT OFFICE.

JAMES H. SCRIBNER, OF ATLANTIC, IOWA, ASSIGNOR OF ONE-HALF TO OTTO E. WEBER, OF SAME PLACE.

SPECTACLE-FRAME-SOLDERING CLAMP.

SPECIFICATION forming part of Letters Patent No. 324,276, dated August 11, 1885.

Application filed May 20, 1885. (No model.)

*To all whom it may concern:*

Be it known that I, JAMES H. SCRIBNER, a citizen of the United States, residing at Atlantic, in the county of Cass and State of Iowa, have invented a new and useful Spectacle and Eyeglass Frame Holder, of which the following is a specification.

The object of my invention is in the manufacture and repair of spectacle and eyeglass frames to quickly adjust and hold firmly together in their proper places the several parts of spectacle and eyeglass frames, especially those parts that have been broken by accident or otherwise, so that the broken or other parts can be brazed or secured firmly to each other; also, to provide a holder that will permit the parts of the frame that are to be brazed to be thoroughly examined upon all their sides while the work of brazing or repairing is in progress without rendering it necessary to remove the frame from the holder, as is required in the ordinary mode of pinning the frame to a piece of charcoal. I attain these objects by the spectacle and eyeglass frame holder illustrated in the accompanying drawings, in which—

Figure 1:
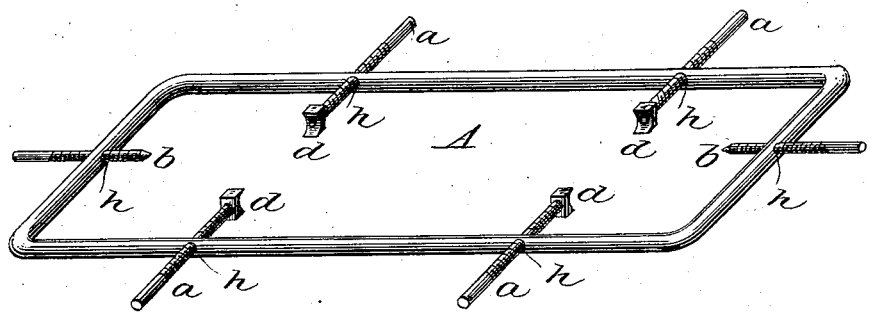
Figure 2:

Figure 1 is a perspective view of my spectacle and eyeglass frame holder. Fig. 2 represents a detailed sectional view of the clutch and screw.

Similar letters refer to similar parts throughout the several views.

The spectacle and eyeglass frame holder comprises the perforated frame A, with its spirally-grooved perforations $h\ h\ h\ h\ h\ h$, said frame A being of sufficient size to admit and surround any spectacle or eyeglass frame; the screws $b\ b$, with their inward ends pointed and made to fit the spirally-grooved holes $h\ h$ in the ends of the frame A; the screws $a\ a\ a\ a$, made to fit the spirally-grooved holes $h\ h\ h\ h$ on the sides of the frame A, and the perforated clutches $d\ d\ d\ d$, which are secured to the ends of the screws $a\ a\ a\ a$ in such a manner that the screws can be revolved without revolving the clutches. This is usually done by reducing the diameter of the screw upon the end which holds the clutch, so that it will fit loosely the hole in the clutch, while that part of the screw which has not been reduced forms a shoulder to prevent the clutch from sliding too far onto the screw; and also by forming a head upon the inward end of the screw to prevent the clutch from slipping off from the screw, the hole which passes through the clutch being sufficiently enlarged upon the concave side of the clutch to contain the head of the screw.

The spectacle and eyeglass frame holder is used in repairing the broken frames of spectacles and eyeglasses in the following manner: The broken frame is placed between the clutches $d\ d\ d\ d$ and the points of the screws $b\ b$. Then by turning the screws $a\ a\ a\ a$ the clutches can be made to approach each other and to seize the spectacle or eyeglass frame and hold it firmly. Then by adjusting the several screws $a\ a\ a\ a$ and $b\ b$ the broken parts of the spectacle or eyeglass frame can be pressed together and held in their proper place by the clutches and screws, and then brazed or repaired.

Having thus described my invention, what I claim as new, and desire to secure by Letters Patent, is—

1. In a spectacle and eyeglass frame holder, the combination of the screws $a\ a\ a\ a$, having swiveled to them the clutches $d\ d\ d\ d$, with the frame A, having threaded apertures, substantially as set forth, and for the purposes specified.

2. The combination, in a spectacle and eyeglass frame holder, of the frame A, with its spirally-grooved perforations $h\ h\ h\ h\ h\ h$ and screws $b\ b$, with the screws $a\ a\ a\ a$, having swiveled to them the clutches $d\ d\ d\ d$, all substantially as set forth.

JAMES H. SCRIBNER.

Witnesses:
EDMUND V. BURKE,
J. B. ROCKAFELLOW.